Patented July 10, 1951

2,559,893

UNITED STATES PATENT OFFICE 2,559,893

METHOD OF COATING CELLULOSE ESTER FILMS

Gale F. Nadeau and Fred W. Hoyt, Rochester, N. Y., assignors to Eastman Kodak Company, Rochester, N. Y., a corporation of New Jersey No Drawing. Application October 4, 1946, Serial No. 701,074

2 Claims. (Cl. 117—144)

This invention relates to the manufacture of thin thermoplastic films and sheets and more particularly to a method of making such articles with microscopically roughened surfaces in order to prevent optical contact between such superimposed surfaces, and/or to provide a surface on which pencil designs may be drawn.

As is well known in this art, film or sheeting may be formed by spreading a thin coating of cellulose ester dope onto an appropriate smooth surface and permitting or causing the solvents to evaporate therefrom. In making continuous thin films and particularly thin sheeting for use as wrapping materials on casting wheels of the type shown in U. S. Patent 2,369,484 of February 13, 1945, to Gale F. Nadeau, considerable difficulty has been experienced in separating adjacent layers of the smooth surfaced sheeting when it is rolled up into a roll or cut and stacked in a pile. This coherence is primarily due to optical contact between the very smooth surfaces and is often further aided by the tendency of the sheets to accumulate charges of static electricity.

In fact a common expedient employed to overcome the blocking of adjacent sheets in the roll has been to interleave the continuously formed and rolled up sheeting with tissue paper, and then to allow the tissue to remain while cutting the continuous strip of sheeting to sheets of a desired size.

Other methods employed have been to roughen the surface of the film or sheet by coating it with materials which will be retained by the surface of the sheet in a rough pattern so that air may exist between adjacent sheets if rolled or stacked up and thus overcome optical contact.

Several materials have been employed previously to produce the roughened surface such as titanium dioxide, ground glass, starch, precipitated cellulose ester derivatives, and so on. These materials are dispersed in a so-called carrier or film former which holds the pigment in place. The carrier may be a solution of cellulose nitrate, cellulose acetate, cellulose acetate butyrate or gelatin.

This dispersion of pigment may be applied to the surface of the sheet by an immersion hopper, a flow hopper, or a bead hopper. One of the most serious difficulties in such an operation is the tendency of the pigment to settle out of the dispersing medium in the solution reservoir or particularly in the coating hopper during coating operations. Settling in the coating hopper leads to lines, streaks and similar defects in the coating on the processed sheet or film. These irregularities interfere with the production of a uniform optical contact preventing surface or a drawing surface as the case may be. One way of preventing too rapid settling of the surface roughening pigments is to increase the viscosity of the carrier solution. However, this becomes impractical due to difficulties in the application of any extremely viscous solution to the surface of the sheeting by the usual means.

Because these pigments or crystalline materials have proved undesirable for one reason or another, the manufacturer has often returned to the surer method of employing interleaving tissues, both in initially making the sheeting or while later fabricating it into formed articles. In the latter instance, the fabricator loses considerable time in removing the interleaving tissue. This is especially the case in operations where one sheet at a time is removed continuously from a stack of sheets.

An object of the invention, therefore, is an improved process of continuously manufacturing thermoplastic film and sheeting including its rolling or stacking, without employing non-sticking interleaves. Another object of the invention is an improved transparent cellulose organic acid ester sheeting which has a microscopically roughened surface but with substantially no impairment of the transparency of the sheeting. A further object of the invention is an improved coating solution in which the surface roughening material exhibits substantially no settling over relatively long-time periods. Still another object is a cellulose ester sheet having a matte surface thereon on which pencilled characters can be written. Other objects will appear hereinafter.

In accordance with the invention, these and other objects are attained by applying to one or both of the surfaces of transparent thermoplastic films and sheets of cellulose organic acid esters, including mixed esters, or thermoplastic resins, a very thin transparent layer of a comparable ester in a volatile solvent solution containing extremely small discrete solid particles of bentonite. On drying, these microscopically divided particles will protrude from the surfaces giving a fine roughness or matte quality to the surfaces which prevents optical contact when such coated sheets are rolled up or stacked in piles. When applied in moderate concentration the particles are so fine as not to be perceptible without the use of a microscope and no noticeable, or only extremely slight, haze is imparted to the sheeting. When applied in larger quantities the particles not only prevent optical contact but also provide a rough surface which will take pencil lines and writing.

The coating containing the bentonite may be applied in any suitable manner as by applicator rolls, sprays, immersion of the sheet in the coating solution, etc.

The advantage of employing bentonite for preventing optical contact is due in a large part to its property of remaining uniformly dispersed in solvent mixtures over long periods of time. We have found it is greatly superior in this respect to other materials heretofore employed for this purpose. Because of its substantially non-settling property the coating mixture can be made up with a predetermined amount of bentonite therein and a coating can be continuously made on thermoplastic sheeting which will result in a substantially uniform distribution of bentonite particles over the surface of the sheeting. With other materials we have found that the concentration of particles in the solution reservoir rapidly diminishes so that the applied coating is non-uniform in its optical contact preventing ability. Therefore, frequent sampling and reincorporation of the particles is required in such cases. By employing bentonite, as described herein, an improved and less expensive process for placing a matte surface on thermoplastic sheeting is made possible.

The bentonite we prefer to employ in our coating composition is a modified montmorillonite comprising a hydrous aluminum or magnesium or aluminum magnesium silicate which is free from coarse-grained impurities. The bentonite may be in a particle-size range of 50 to <5 microns. Particularly good results have been achieved with <5 micron-sized particles.

In preparing the coating solution, the bentonite is simply stirred into the ester-solvent solution. It exhibits the unusual property of forming stable dispersions in such carrier solutions. The simple stirring technique affords considerable saving in time and power over milling the pigment in a dispersion as has been required in dispersing other types of pigments in the more viscous solutions often used for similar coatings. In the event a relatively clear sheet is desired we may employ a concentration of bentonite within the range of 0.1 to 1.0%. For a sheet in which greater transparency is desired, a bentonite concentration of 0.1 to 0.5% is generally employed. For the production of a sheet having both resistance to optical contact and one which can take pencil writing, the coating solution may contain 1.0 to 5.0% bentonite.

We prefer to form our films and sheeting continuously on a slowly revolving polished drum, such as shown in the above-mentioned Nadeau patent. As the sheet is formed, it passes along to the wind-up roll and during this travel the solution containing the bentonite may be applied to it on both sides by roll applicators of the types shown in U. S. Patent 2,011,348 of August 13, 1935. The film or sheeting is then further dried to expel the volatile solvents and permit the coating of ester and bentonite to adhere to the base sheet. The resulting sheet, therefore, has the above described microscopically roughened surface which, when wound up in a roll or stacked in piles, does not permit optical contact blocking.

The invention is further illustrated in the following examples:

*Example 1.*—A continuous thin sheet of cellulose acetate was uniformly coated and dried in a device similar to that shown in Fig. 3 of the above-mentioned U. S. Patent 2,011,348. This device comprises an applicator roll which dips into the coating solution and transfers it to the continuous sheet being conducted through the solution on the upper surface of the roll but out of contact with the roll. The coating solution contained:

0.5% cellulose acetate
0.2% B. C. bentonite (a modified montmorillonite)
Balance: A solvent mixture consisting of 55% methanol, 10% methyl Cellosolve, and 35% acetone.

As will be apparent to those skilled in the art, the direction of travel of the continuous sheet after one side is coated is reversed so that the opposite side of the sheet can be brought into contact with the solution on the applicator roll. After each coating, the sheet is passed through a suitable drying chamber maintained at a temperature above that of the volatile solvents, wherein the volatile solvents are expelled and the acetate-bentonite coating is affixed to the sheet.

*Example 2.*—A continuous thin sheet of cellulose acetate butyrate was uniformly coated and dried in the manner described in Example 1. The coating solution contained:

0.5% low viscosity cellulose acetate
0.1% B. C. bentonite
Balance: A solvent mixture consisting of 55% methanol, 10% methyl Cellosolve, and 35% acetone.

We have found that thermoplastic sheeting coated in this manner with this solution causes no difficulty in the manufacturing operations. The customary paper interleaving operation at the windup is omitted, and the sheeting can be stacked and cut without interleaving. Blocking does not occur, and with the coated sheeting strong joints can be made readily by cementing with the usual solvent cements. The solid particles in the surface layer are soft enough so that no difficulty due to surface abrasion is experienced. The coated sheet is not changed very much in appearance, and when a transparent sheet is coated with the above solution, no substantial reduction in transparency can be noted on ordinary examination.

*Example 3.*—A continuous thin sheet of cellulose acetate was uniformly coated and dried in the manner described in Example 1. The coating solution contained:

5% bentonite
1.5% low viscosity cellulose acetate butyrate
9.7% ethylene dichloride
1.1% methanol
Balance acetone This coated sheet did not block when stacked or rolled and would take pencil lines and writing.

Our process is adaptable to the coating of other kinds of thin sheeting, such as cellulose acetate butyrate, cellulose acetate propionate, cellulose propionate, cellulose butyrate, ethyl cellulose and benzyl cellulose sheets. Also, resin sheeting made from polyvinyl compounds, polyethylene, polystyrene, etc. may be advantageously coated with the bentonite solution to aid in preventing optical contact and mutual sticking when the sheeting is rolled or stacked together. It will be understood that while the solvent mixtures described

We claim:

1. The method of preventing optical contact between superimposed surfaces of transparent cellulose ester films without substantially impairing the transparency of the films comprising substantially uniformly coating at least one surface of the film with a suspension containing 0.1 to 0.2% bentonite particles of a particle size within the range of 50 to <5 microns in a solution of 0.5% low viscosity cellulose acetate in 55% methanol, 10% methyl Cellosolve and 35% acetone, and affixing the bentonite particles to the surfaces by drying the coating.

2. The method of preventing optical contact between superimposed surfaces of transparent cellulose ester films without substantially impairing the transparency of the films comprising substantially uniformly coating at least one surface of the film with a suspension containing 0.2% bentonite particles having a particle size of approximately 5 microns in a solution of 0.5% low viscosity cellulose acetate in 55% methanol, 10% methyl Cellosolve and 35% acetone, and affixing the bentonite particles to the surfaces by drying the coating.

GALE F. NADEAU.
FRED W. HOYT.

REFERENCES CITED

The following references are of record in the file of this patent:

UNITED STATES PATENTS

| Number | Name | Date |
|---|---|---|
| 1,982,778 | Andersen | Dec. 4, 1934 |
| 2,084,313 | Beach | June 22, 1937 |
| 2,147,312 | Partridge | Sept. 14, 1939 |
| 2,245,499 | Reichel et al. | June 10, 1941 |
| 2,266,638 | Hauser | Dec. 16, 1941 |
| 2,332,696 | Champion | Oct. 26, 1943 |
| 2,338,664 | Nadeau | Jan. 4, 1944 |
| 2,386,626 | Nadeau | Oct. 9, 1945 |